(12) United States Patent
Kim et al.

(10) Patent No.: US 9,140,964 B2
(45) Date of Patent: Sep. 22, 2015

(54) METHOD AND APPARATUS FOR OPERATING PROJECTION MODE IN PROJECTION DEVICE

(75) Inventors: Young Ho Kim, Yongin-si (KR); Hai Min Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 13/082,757

(22) Filed: Apr. 8, 2011

(65) Prior Publication Data

US 2011/0248983 A1   Oct. 13, 2011

(30) Foreign Application Priority Data

Apr. 9, 2010   (KR) .......................... 10-2010-0032860

(51) Int. Cl.
 *G06F 1/16*   (2006.01)
 *G03B 21/14*   (2006.01)
 *H04M 1/02*   (2006.01)

(52) U.S. Cl.
 CPC .............. *G03B 21/14* (2013.01); *G06F 1/1639* (2013.01); *H04M 1/0272* (2013.01)

(58) Field of Classification Search
 CPC ..................................................... G06F 1/1639
 USPC .............. 345/311–212, 211–212; 353/88, 97, 353/101, 119; 359/511
 See application file for complete search history.

(56) References Cited

U.S. PATENT DOCUMENTS

| | | | |
|---|---|---|---|
| 2004/0067784 A1* | 4/2004 | Kubo et al. | 455/575.4 |
| 2007/0088758 A1* | 4/2007 | Hwang | 707/200 |
| 2007/0265717 A1* | 11/2007 | Chang | 700/83 |
| 2010/0026818 A1* | 2/2010 | Yang et al. | 348/207.99 |
| 2010/0197354 A1* | 8/2010 | Lee et al. | 455/566 |
| 2011/0134300 A1* | 6/2011 | Chung | 348/333.01 |

* cited by examiner

*Primary Examiner* — Michael Pervan
(74) *Attorney, Agent, or Firm* — Jefferson IP Law, LLP

(57) ABSTRACT

A projection device capable of automatically controlling on/off of a projection module for projecting display data onto an exterior surface according to an open/closed state of a cover of the projection module, and an operation method thereof are provided. The method for operating a projection module in a projection device includes turning-on the projection module when a first detection signal is detected, wherein the first detection signal is generated when a cover of the projection module is open, and after the projection module is turned on, turning-off the projection module when a second detection signal is detected, wherein the second detection signal is generated when a cover of the projection module is closed.

18 Claims, 4 Drawing Sheets

METHOD AND APPARATUS FOR OPERATING PROJECTION MODE IN PROJECTION DEVICE

PRIORITY

This application claims the benefit under 35 U.S.C. §119(a) of a Korean patent application filed on Apr. 9, 2010 in the Korean Intellectual Property Office and assigned Serial No. 10-2010-0032860, the entire disclosure of which is hereby incorporated by reference.

BACKGROUND OF THE INVENTION

1. Field of the Invention

The present invention relates to a projection device having a projection function. More particularly, the present invention relates to an apparatus for automatically controlling on/off of a projection module in a projection device, and thus automatically controlling activation/inactivation of a projection mode, and a control method thereof.

2. Description of the Related Art

In recent years, with the significant development of information and communication technology, and semiconductor technology, supply and use of all types of portable terminals have rapidly increased. In particular, recent portable terminals have been developed that converge functions that were originally only available in diverse terminals. As a representative example of the portable terminals, a mobile communication terminal provides various functions such as a TeleVision (TV) watching function (e.g., mobile broadcasting such as Digital Multimedia Broadcasting (DMB) or Digital Video Broadcasting (DVB)), a music playing function (e.g., Moving Picture Experts Group (MPEG)-1 or MPEG-2 Audio Layer-3 (MP3)), a photographing function, and an Internet access function as well as a general communication function such as speech call or message transmission/reception.

The portable terminals output display data to be displayed through a display device included therein. The size of a display device included in each portable terminal is generally small due to a restriction of a size of the portable terminal.

Accordingly, attempts at using a large screen by implementing an image projection function of a portable terminal have been made. For example, research on a portable terminal capable of displaying display data of the portable terminal with a projection function using a wall or a bottom as an external screen has been carried out. The portable terminal with the projection function may output display data, which is normally output through a display device of the portable terminal, to the external screen. The popularity of a portable terminal with the projection function is increasing. Correspondingly, various technologies for the convenience of users have been applied in a portable terminal with the projection function.

SUMMARY OF THE INVENTION

Aspects of the present invention are to address at least the above-mentioned problems and/or disadvantages and to provide at least the advantages described below. Accordingly, an aspect of the present invention is to provide a projection device with a projection function capable of automatically executing a projection mode based on a state of a cover of a projection module.

Another aspect of the present invention to provide an optimal control environment for executing a projection mode in a projection device.

Another aspect of the present invention is to provide an apparatus for automatically turning-on/off a projection module according to the opening/closing of a cover of a projection module in a projection device and thus automatically controlling activation/inactivation of a projection mode, and a control method thereof.

Another aspect of the present invention is to improve usability and convenience of a projection device by automatically controlling execution/termination of a projection mode according to the opening/closing of a cover of a projection module in the projection device.

In accordance with an aspect of the present invention, a method for operating a projection module in a projection device is provided. The method includes turning-on the projection module when a first detection signal is detected, wherein the first detection signal is generated when a cover of the projection module is open, and after the projection module is turned on, turning-off the projection module when a second detection signal is detected, wherein the second detection signal is generated when a cover of the projection module is closed.

In accordance with another aspect of the present invention, a method for operating a projection mode in a projection device is provided. The method includes operating in a normal mode, wherein the normal mode includes a mode in which display data is output using a display module of the projection device, determining whether a detection signal provided from a state sensor has a first voltage or a second voltage, while operating in the normal mode, if it is determined that the detection signal has the first voltage, continuing to operate in the normal mode, if it is determined that the detection signal has the second voltage while operating in the normal mode, turning-on a projection module of the projection device, and switching from the normal mode to the projection mode to operate in the projection mode, wherein the projection mode includes a mode in which display data is output using the projector module of the projection device.

In accordance with another aspect of the present invention, the method for operating a projection mode in a projection device further includes determining whether the detection signal provided from the state sensor has the first voltage or the second voltage, while operating in the projection mode, if it is determined that the detection signal has the first voltage while operating in the projection mode, switching from the projection mode to the normal mode, and turning-off the protection module.

In accordance with another aspect of the present invention, a projection device is provided. The device includes a projection module for projecting display data onto an exterior surface, a cover engaged with the projection device to selectively cover and protect the projection module, a state sensor for detecting open and closed states of the cover and for outputting a corresponding detection signal, and a controller for controlling one of on and off of the projection module according to the detection signal provided from the state sensor.

The cover includes a magnetic substance for generating a magnetic field. The state sensor includes a magnetic sensor for reacting to the magnetic field. The controller includes a General Purpose Input/Output (GPIO) which is electrically coupled to an output port of the state sensor to receive the detection signal. The projection device further includes a display module for displaying display data, and the controller neglects the detection signal provided from the state sensor when the display module is turned-off.

As described above, in a method and an apparatus for operating a projection mode in a projection device, an operating method is provide that is capable of automatically controlling activation/inactivation of a projection mode according to open/closed states of a cover of a projection module. Exemplary embodiments of the present invention may provide an optimal environment for simply executing a projection mode in a projection device, and implement a function of automatically turning on/off the projection module according to the open/closed state of a cover of a projection module. In exemplary embodiments of the present invention, a user may automatically execute and terminate projection module and a projection mode by opening or closing a cover of a projection module. The exemplary embodiments of the present invention may improve usability, convenience, and competitive power of a projection device by minimizing troublesome manipulations to execute or terminate a projection mode in the projection device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspect, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate a projection device with a projection function and a method for operating a projection mode in the projection device. An exemplary embodiment of the present invention may automatically control activation and inactivation of a projection mode in which display data is projected according to an opening/closing of a cover of a projection module in a projection device. To this end, a state sensor senses an opening and closing of a cover of a projection module according to an exemplary embodiment of the present invention. According to an exemplary embodiment of the present invention, provided is a projection device and a control method thereof capable of controlling on/off of a projection module according to a signal detected by the state sensor, and thereby automatically controlling activation/inactivation of a projection mode.

Hereinafter, a configuration of a projection device and an operation control method thereof according to an exemplary embodiment of the present invention will be described with reference to FIG. 1 to FIG. 5. However, a configuration of a projection device and an operation control method thereof according to an exemplary embodiment of the present invention are not limited to the disclosure provided herein, and thus the present invention is applicable to various other embodiments.

Figure 1:
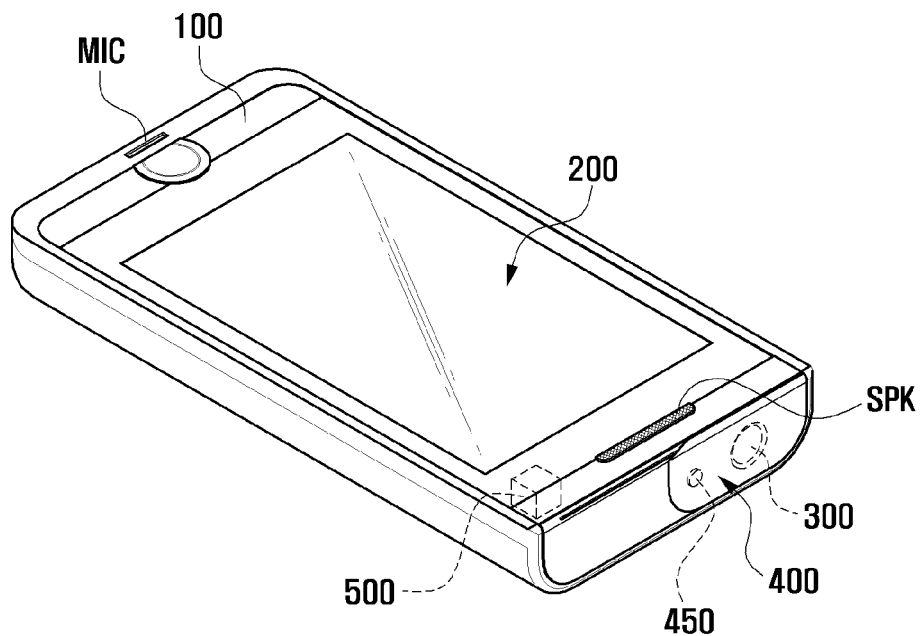
FIG. 1 and FIG. 2 are perspective views illustrating examples of a projection device according to an exemplary embodiment of the present invention.
Figure 2:
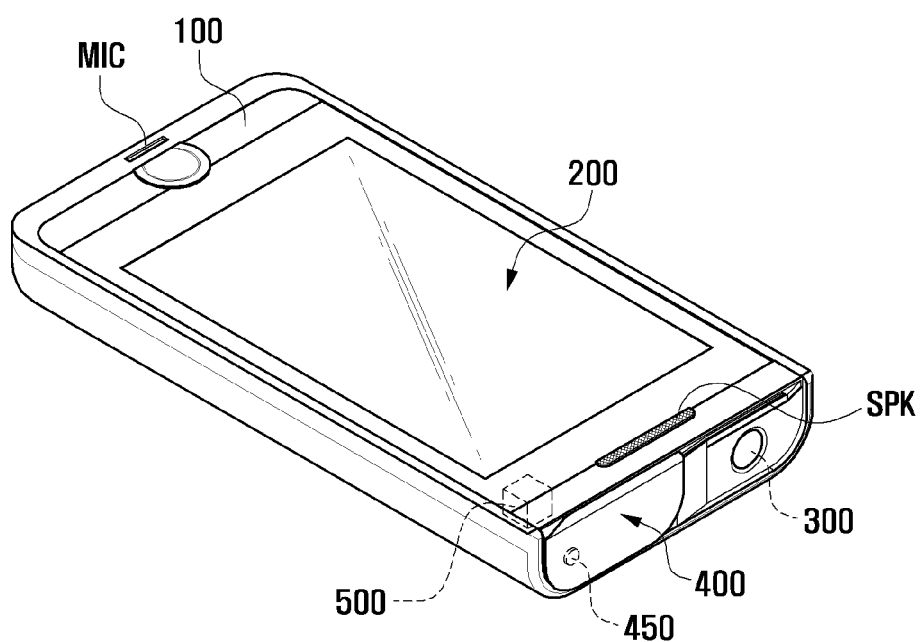

FIG. 1 and FIG. 2 are perspective views illustrating examples of a projection device according to an exemplary embodiment of the present invention.

Referring to FIG. 1 and FIG. 2, a bar type portable terminal is shown with a full touch-screen provided on a front surface thereof. In particular, FIG. 1 indicates a case where a cover 400 of a projection module 300 is closed, and FIG. 2 indicates a case where a cover 400 of a projection module 300 is open.

Referring to FIG. 1 and FIG. 2, a projection device of an exemplary embodiment of the present invention includes an input unit 100 for creating various input signals of a user, a display module 200 for outputting display data according to an execution of a function of the projection device, a projection module 300 for projecting the display data onto an external surface, a cover 400 engaged with a device body for covering and protecting the projection module 300, a magnetic substance 450 positioned on the cover 400 for informing of one of an open or closed state of the cover 400, and a state sensor 500 for detecting the open and closed states of the cover 400 according to a detection of a magnetic field generated by the magnetic substance 450. Although the projection device may further include a focus controller (not shown) for controlling a focus of the projection module 300, a speaker SPK for outputting various audio signals according to execution of a function of the projection device, and a microphone MIC for receiving input of an external audio signal such as user's speech, a detailed description and indications thereof are omitted for conciseness in explanation.

In an exemplary embodiment of the present invention, the projection module 300 outputs various display data created by the projection device that is projected onto an eternal surface. An operation of the projection module 300 will be described further below.

In an exemplary embodiment of the present invention, the state sensor 500 detects the open and closed states of a cover 400 of the projection module 300. A Hall Integrated Circuit (IC) is an example of the state sensor 500 according to an exemplary embodiment of the present invention. In this case, the Hall IC is one type of a magnetic sensor that reacts to a magnetic field. The state sensor 500 may be disposed at a position in a body of the projection device in consideration of a recognition range in which a magnetic field is capable of being recognized according to the open and closed states of a cover 400. The magnetic substance 450 generates the magnetic field and may be positioned in a cover 450 in consideration of the recognition range of the state sensor 500. Meanwhile, mounting positions of the state sensor 500 and the magnetic substance 450 are not limited to the locations shown in FIG. 1 and FIG. 2. However, the mounting positions of the state sensor 500 and the magnetic substance 450 may vary according to a design of the projection device by forming a suitable spacing distance capable of detecting a change in a state of the cover 400.

The state sensor 500 may detect a magnetic field generated by a magnetic substance 450 such as a magnet mounted at a cover 400 of the projection module 300. Further, upon detection of the magnetic field, the state sensor 500 generates and provides a high voltage. When the magnetic field is not detected, the state sensor 500 generates and outputs a low voltage. This will be explained with reference to FIG. 3 by way of example. In an alternative exemplary embodiment, upon detection of the magnetic field, the state sensor 500 may generate and provide a low voltage. Correspondingly, in the alternative exemplary embodiment, when the magnetic field is not detected, the state sensor 500 may generate and output a high voltage. In this disclosure, the term 'high voltage' refers to a voltage that is higher than a voltage referred to herein as a "low voltage".

Figure 3:
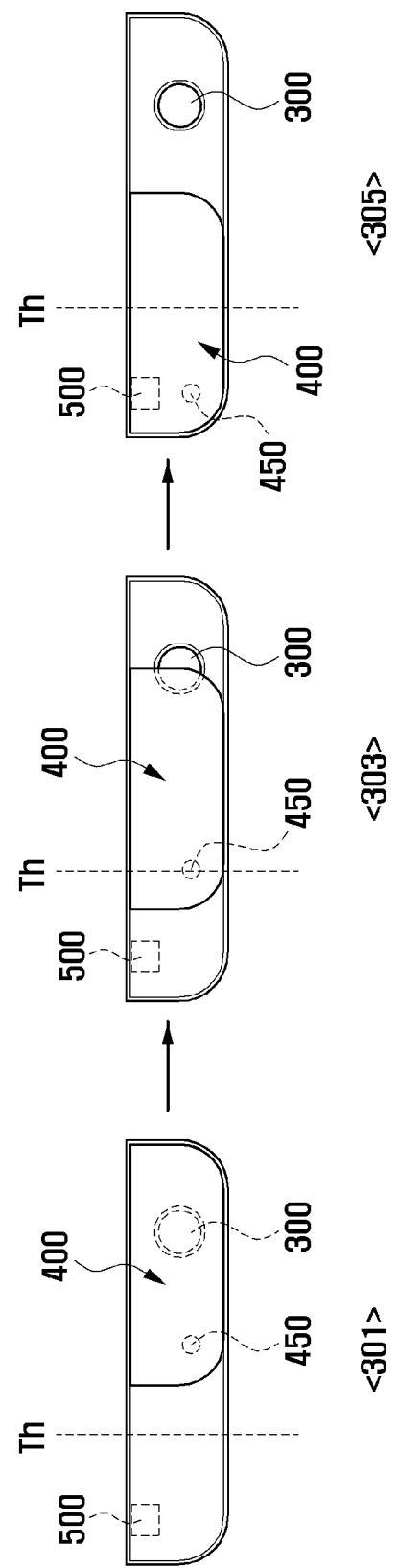
FIG. 3 is a view illustrating open/close operations of a cover of a projection module in a projection device according to an exemplary embodiment of the present invention.

FIG. 3 is a view illustrating an open/close operation of a cover of a projection module in a projection device according to an exemplary embodiment of the present invention.

Referring to FIG. 3, as illustrated in reference numeral 301, it is assumed that a cover 400 of a projection module 300 is closed.

As described previously, a magnetic substance 450 generating a magnetic field may be positioned at one area of the cover 400. The magnetic substance 450 may be disposed according to a design considering a recognition range of a state sensor 500. The state sensor 500 may be provided at a body of the projection device, and one output port thereof may connect with a controller 700 (shown in FIG. 4) of the projection device. In particular, an output port provided at one side of the state sensor 500 may be electrically coupled with a General Purpose Input/Output (GPIO) of the controller 700. Reference numeral Th of FIG. 3 represents a reference threshold range where the state sensor 500 may recognize a magnetic field generated by the magnetic substance 450.

As illustrated in reference numeral 301, the cover 400 may be opened according to a provision form of the cover 400 of the projection module 300 in a closed state of the cover 400. For example, the cover 40 may be open and closed according to a sliding movement from side to side (or up and down), an attachment and detachment to and from the projection device, and a hinge type engagement with a body by a hinge and moving backwards and forwards according to a designed form of the cover 400. In FIG. 3, the cover 400 is provided with a sliding movement by way of example.

Accordingly, in a state where the cover 400 is closed as illustrated in reference numeral 301, the cover 400 may move to a left side as illustrated in reference numeral 303. The cover 400 may be partially opened according to movement to the left side. As the cover 400 is gradually opened according to the movement thereof to the left side, a magnetic substance 450 of the cover 400 may enter within a recognition range of the state sensor 500. For example, as illustrated in reference numeral 303, the magnetic substance 450 may be provided at a position of a threshold range that the state sensor 500 may recognize a magnetic field. Accordingly, the state sensor 500 detects a magnetic field generated by the magnetic substance 450 and outputs a high voltage according to a corresponding current to a GPIO of the controller. Consequently, when the magnetic substance 450 reaches a position of the threshold range, the projection device turns-on the projection module 300 and activates a projection mode.

Further, by an open operation as described above, the cover 400 may be completely opened as illustrated in reference numeral 305. Accordingly, the projection device may project display data onto an external surface.

In the meantime, by a reverse operation of reference numerals 301, 303, and 305, the cover 400 may be switched from open state to closed state. In this case, the magnetic substance 450 may be positioned beyond a recognition range (e.g., threshold Th) of the state sensor 500 by a close operation of the cover 400. Accordingly, the state sensor 500 does not detect a magnetic field generated by the magnetic substance 450. When the magnetic field is not detected, the state sensor 500 outputs a low voltage to GPIO of the controller. Accordingly, when the magnetic substance 450 is beyond a position of the threshold range, the projection device deactivates the projection mode and turns-off the projection module 300.

As previously described, and as shown in FIG. 1 and FIG. 3, it is appreciated that a spacing distance between the state sensor 500 and the magnetic substance 450 positioned in the cover 400 is increased when the cover 400 of the projection module 300 is closed. When the magnetic field is not detected according to the spacing distance between the state sensor 500 and the magnetic substance 450, the state sensor 500 generates a low voltage. The low voltage is transferred to a controller of the projection device, and the controller turns-off the projection module 300 while applying the low signal from the state sensor 500 thereto.

As previously described, and as shown in FIG. 2 and FIG. 3, it is appreciated that the spacing distance between the state sensor 500 and the magnetic substance 450 positioned in the cover 400 is proximate when the cover 400 of the projection module 300 is open. As previously described, when a magnetic field is detected due to the spacing distance between the state sensor 500 and the magnetic substance 450, the state sensor 500 generates a high voltage. The high voltage is transferred to the controller of the projection device, and the controller turns-on the projection module 300 when the high voltage from the state sensor 500 is applied thereto.

As mentioned above, in an exemplary embodiment of the present invention, when the cover 400 of the projection module 300 is closed as shown in FIG. 1 or FIG. 3, a distance between the state sensor 500 and the magnetic substance 450 is beyond a range that the state sensor 500 may recognize a magnetic field. In this case, the projection device determines that a current cover 400 is closed and maintains an off state of the projection module 300.

On the other hand, when the cover 400 of the projection module 300 is open as shown in FIG. 2 or FIG. 3, a distance between the state sensor 500 and a magnetic substance 450 of the cover 400 is located within a range of a magnetic field that the state sensor 500 may recognize. In this case, the projection device determines that a cover 400 is presently open, turns-on the projection module and activates a projection module 300 to project display data onto an external surface. When a closed state of the cover 400 is sensed by an operation during execution of the projection mode, the executed projection mode is deactivated and the projection mode is switched to an off state.

Relationships between the projection module 300, the cover 450, and the state sensor 500 according to an operation of an exemplary embodiment of the present invention may be expressed in Table 1.

TABLE 1

| Cover | State sensor | Projection module |
|---|---|---|
| Open | High output | On |
| Close | Low output | Off |

As illustrated in Table 1, when the cover 400 is open, the state sensor 500 outputs a high voltage to a controller of the projection device, and the controller turns-on the projection module 300 upon detecting the high voltage from the state sensor 500. On the other hand, when the cover 400 is closed, the state sensor 500 outputs a low voltage to the controller of the projection device, and the controller turns-of the projection module 300 upon detecting the low voltage from the state sensor 500.

Figure 4:
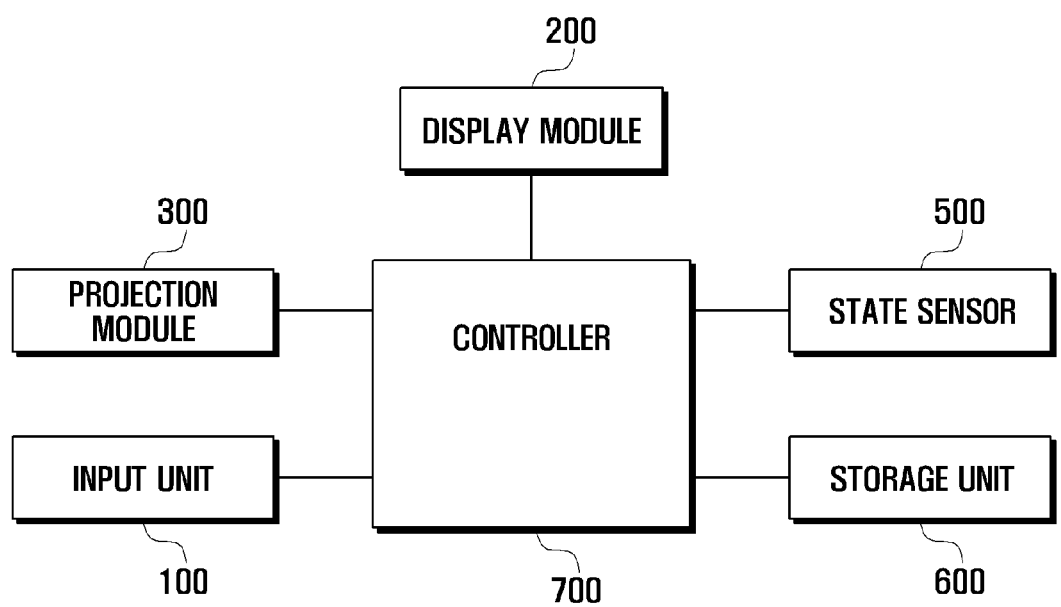
FIG. 4 is a block diagram schematically illustrating a configuration of a portable terminal according to an exemplary embodiment of the present invention.

FIG. 4 is a block diagram schematically illustrating a configuration of a portable terminal according to an exemplary embodiment of the present invention.

Referring to FIG. 4, the projection device includes an input unit 100, a display module 200, a projection module 300, a state sensor 500, a storage unit 600, and a controller 700.

The projection device may further include a Radio Frequency (RF) unit for executing a communication function, an audio processing unit with a microphone MIC and a speaker SPK, a digital broadcasting module for receiving and playing a digital broadcasting (e.g., mobile broadcasting such as Digital Multimedia Broadcasting (DMB) or Digital Video Broadcasting (DVB)), a camera module for executing a photographing function, a Bluetooth communication module for executing a Bluetooth communication function, and an Internet communication module for executing an Internet communication function. However, a detailed description and indications thereof are omitted for conciseness in explanation.

The input unit 100 detects a user operation and generates and transfers a corresponding input signal to the controller 700. The input unit 100 may be configured by a plurality of buttons. In particular, the input unit 100 may include at least one button generating an input signal according to a user operation in a projection mode.

The display module 200 provides respective execution display data of applications supported from a projection device. For example, the display module 200 provides execution display data of a message function, an electronic mail function, an Internet function, a web browser function, a multimedia function, a searching function, a communication function, an electronic book reading function (e.g., e-book), a moving image function, a photographing function, a photograph viewing function, a TeleVision (TV) watching function (e.g., mobile broadcasting such as DMB or DVB), a music playing function, and a widget function. A Liquid Crystal Display (LCD) may be used as the display module 200. However, other display devices such as an Organic Light Emitting Diode (OLED) and Active Matrix OLED (AMOLED) may be used as the display module 200.

Upon displaying the display data, the display module 200 may provide a horizontal mode or a vertical mode. The display module 200 may include a touch input unit (not shown). That is, the display module 200 may be implemented as a touch screen. The display module 200 may generate and transfer an input signal according to user input by a construction of a touch screen to a controller 700. Further, the display module 200 may display the display data according to a projection mode. The display module 200 may be omitted according to a type of the projection device. For example, when the projection device of an exemplary embodiment of the present invention is not the portable terminal as mentioned above, but is a projector with a general external output function, a construction of the display module 200 may be omitted. The projector module 300 may project display data transferred from a peripheral device connected though a predetermined interface. When a cover is in an open state, the projector module 300 is automatically turned on. When the cover is closed, the projector module may be turned off.

The projection module 300 is mounted in the portable terminal or is configured as an external type, and magnifies various display data provided from the controller 700 through a lens and projects the magnified display data onto an external surface. That is, the projection module 300 is a device capable of projecting various display data processed by the controller 700 without distortion.

As described previously, the state sensor 500 detects whether a cover 400 of the projection module 300 is open or closed. The state sensor 500 may use a Hall IC, which is one type of a magnetic sensor that reacts to a magnetic field. When an electric current is generated according to a magnetic field generated by a magnetic substance 450 positioned on the cover 400 (e.g., when the magnetic substance 450 enters within a recognition range of the state sensor 500), the state sensor 500 outputs a corresponding high voltage to the controller 700. Meanwhile, when an electric current is not generated according to a magnetic field generated by a magnetic substance 450 positioned on the cover 400 (e.g., when the magnetic substance 450 is beyond the recognition range of the state sensor 500), the state sensor 500 outputs a corresponding low voltage to the controller 700.

The storage unit 600 stores all types of programs and data executed and processed by the projection device. The storage unit 600 may be configured by at least one of a volatile memory device and a non-volatile memory device. For example, the storage unit 600 may continuously or temporarily store an Operating System (OS) of the projection device, programs and data associated with a control operation of the projection module 300, programs and data associated with control of an operation of the projection mode according to open and closed states of the cover 400, and programs and data associated with a display control operation of the display module 200.

The controller 700 controls an overall operation of the projection device. The controller 700 may control a function operation according to operation of the projection mode according to an exemplary embodiment of the present invention. For example, when a high voltage is detected from the state sensor 500 while displaying an idle screen or display data according to execution of a predetermined application are displayed in a normal mode through the display module 200, the controller 700 controls to turn on the projection module 300. For example, when a high voltage is applied to the controller 700 through a GPIO (not shown) electrically coupled to an output port of the state sensor 500, the controller 700 may control the projection module 300 to be turned on.

When the projection module 300 is turned on, the controller 700 switches from the normal mode to a projection mode to control a projection of display data through the projection module 300. In this case, upon control of the external output of the display data, the controller 700 may control output of internal display data displayed on the display module 200 and external display data in the same form or different forms. For example, a User Interface (UI) provided according to an executed application may be output as the internal display data to operate a projection mode in the projection device. Corresponding display data itself played or executed according to an execution application (or idle screen) may be projected onto the external surface.

Further, when a low voltage is detected from the state sensor 500 during the operation of the projection mode, the controller 700 switches from the normal mode to the projection mode and turns-off the projection module 300. For example, when a low voltage is applied to the controller 700 through a GPIO (not shown) electrically coupled to an output port of the state sensor 500, the controller 700 may turn off the projection module 300. For example, the controller 700 may interrupt the supply of power to the projection module 300. In this case, upon switching from the projection mode to the normal mode, the controller 700 may change a display type of the internal display data provided from the display module 200. For example, the controller 700 may omit a user interface provided according to execution of the projection mode and output only corresponding display data according to an executed application (or idle screen).

In the meantime, the controller 700 may neglect a detection signal (e.g., high voltage or low voltage) from the state sensor 500 in an off state of the display module 200. For example, the controller 700 may omit an operation of the projection mode regardless of an opening/closing of the cover 400 in the off state of the display module 200. Such an operation is performed when the projection device is a device (e.g., portable terminal, etc.) with the display module 200. When the projection device is a device (e.g., portable terminal, etc.) without the display module 200, the operation may be omitted.

Moreover, the controller 700 performs all types of control operations associated with a typical function of the projection device. For example, upon execution of an application in a normal mode, the controller 700 may control an operation of the application. Upon external output of display data in the projection mode, the controller 700 may control a function operation such as switching the display data.

Meanwhile, the projection device of an exemplary embodiment of the present invention shown in FIG. 1 to FIG. 4 is applicable to all types of portable terminals such as a bar type, a folder type, a slide type, a swing type, and a flip type. The portable terminal of an exemplary embodiment of the present invention may include all information and communication devices and multi-media devices, and application devices thereof. For example, the portable terminal may include a small device such as Smart Phone, Portable Multimedia Player (PMP), Personal Digital Assistant (PDA), digital broadcasting player, music player (e.g., MP3 player), and a portable game terminal as well as mobile communication terminal operating based on respective communication protocols corresponding to various communication systems.

Furthermore, a projection device and a method for controlling execution of a projection mode thereof according to an exemplary embodiment of the present invention may be applied to a medium-large device such as projector, TV, Large Format Display (LFD), Digital Signage (DS), media pole, Personal Computer (PC), Notebook, etc.

Figure 5:
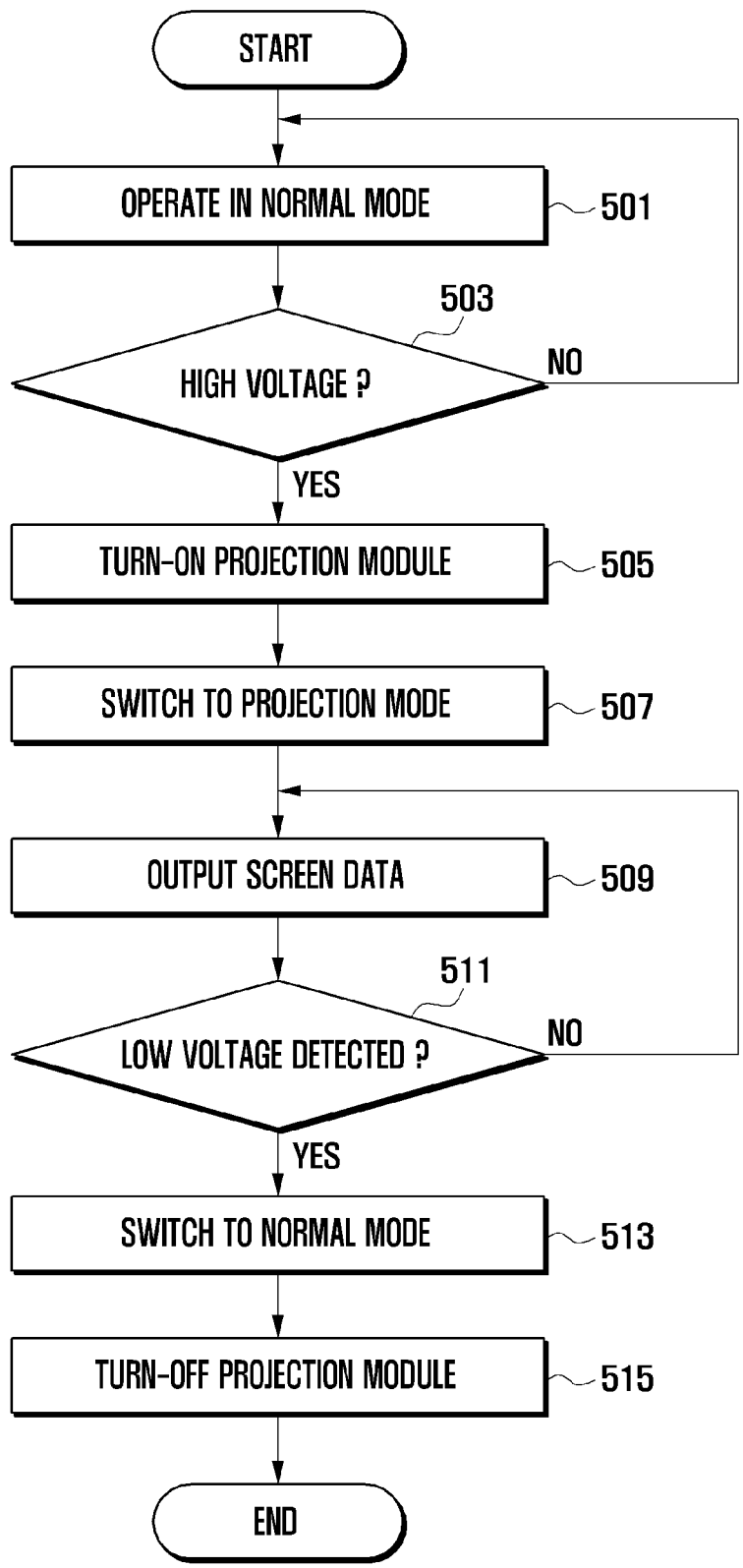
FIG. 5 is a flowchart illustrating a method for operating a projection mode in a projection device according to an exemplary embodiment of the present invention.

FIG. 5 is a flowchart illustrating a method for operating a projection mode in a projection device according to an exemplary embodiment of the present invention.

Referring to FIG. 5, a controller 700 may control an operation in a normal mode of a projection device in step 501. For example, when the projection device is a portable terminal with a display module 200 as previously described, the controller 700 may control the display of an idle screen or display data corresponding to execution of a certain application. Meanwhile, when the projection device is a projector without the display module 200 as previously described, the controller 700 may control the detection of a detection signal (e.g., high voltage or low voltage) an idle mode. At this time, it is assumed that the controller 700 is receiving a low voltage from a state sensor 500 at step 501. For example, as previously described, it is assumed that a cover 400 of a projection module 300 is closed.

Further, the controller 700 may detect a detection signal from the state sensor 500 while controlling the operation according to the normal mode of the projection device. In this case, when the detection signal has a high voltage, the controller 700 may determine that the cover 400 is open as previously described with reference to Table 1, and control execution of a projection mode, which is described further below. On the other hand, when the detection signal has a low voltage, the controller 700 may determine that the cover 400 is closed as previously described with reference to Table 1, and control a general operation, which is described further below.

Next, the controller 700, in step 503, determines whether a high voltage is detected during the operation in the normal mode at step 501. When the high voltage is not detected from the state sensor 500, the controller 700 returns to step 501 and controls the operation in the normal mode as explained above. For example, when the low voltage is continuously detected, the controller 700 may determine that the cover 400 is closed and continuously performs an operation according to user selection in the normal mode.

In contrast, when the high voltage is detected from the state sensor 500, the controller 700 turns-on the projection module in step 505. For example, when the cover 400 is open, the state sensor 500 detects a magnetic field generated by a magnetic substance 450 in the cover 400 and thus outputs a high voltage to the controller 700. Accordingly, the controller 700 may receive a detection signal according to the high voltage of the state sensor 500 through a GPIO. Next, upon detection of the high voltage, the controller 700 controls activation of the projection module 300.

Next, when the projection module 300 is turned-on, the controller 700 switches from the normal mode to the projection mode in step 507. The projection mode denotes a mode of outputting display data created through the projection device. After switching to the projection mode, the controller 700 controls output of display data in step 509. For example, the controller 700 transfers the display data to be output to the projector module 300, and the projection module 300 projects the display data onto an external surface.

Subsequently, the controller 700 determines whether a low voltage is detected while outputting display data according to an operation of the projection mode in step 511. When the low voltage is not detected from a state sensor 500, the controller 700 returns to step 509 and controls an operation in a projection mode.

For example, when the high voltage is continuously detected, the controller 700 may determine that the cover 400 is open and may continuously perform the operation in a projection mode.

In contrast, when a low voltage is detected from the state sensor 500, the controller 700 switches the projection mode to the normal mode in step 513. When the controller 700 switches to the normal mode, it turns-off the projection module 300 in step 515. For example, when the cover 400 is closed, the state sensor 500 does not detect a magnetic field generated by a magnetic substance 450 in the cover 300. Accordingly, the state sensor 500 outputs a low voltage to the controller 700. Consequently, the controller 700 may receive a detection signal according to the low voltage of the state sensor 500 through a GPIO. When the low voltage is detected, the controller 700 deactivates the projection mode and turns-off the projection module 300.

Meanwhile, a method for operating a projection mode in a projection device of an exemplary embodiment of the present invention as described above may be implemented in a program command form executable by various computer means and be recorded in a computer readable recording medium. In this case, the computer readable recording medium may include a program command, a data file, and a data structure individually or a combination thereof. In the meantime, the program command recorded in a recording medium may be specially designed or configured for exemplary embodiments of the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated with at least one software module to perform an operation of exemplary embodiments of the present invention, and a reverse operation thereof is the same.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for operating a projection mode in a projection module is mounted in a portable terminal or is configured in an external type, the method comprising:
    opening a cover of the projection module according to a sliding type moving;
    detecting a detection signal from a state sensor while performing an operation in a normal mode, the detection signal being generated when the cover of the projection module is open;
    automatically turning-on the projection module for projecting a various external screen data when the detection signal is detected and a display module of the portable terminal is in an on state;
    displaying an internal screen data to operate a function of the projection module on a display; and
    outputting an audio corresponding to the various external screen data be projected to an exterior through an audio processing unit according to execution of the function of the projection module; and
    storing data associated with control of operation corresponding to the function of the projection module,
    wherein the detection signal is generated when the cover approaches within a recognition range of the state sensor by a close and/or an open operation of the cover.

2. The method of claim 1, wherein the detection signal has a lower voltage than a second detection signal.

3. A method for operating a projection mode in a projection module mounted in a portable terminal or configured in an external type, the method comprising:
    opening a cover of the projection module according to a sliding type moving;
    operating in a normal mode, wherein the normal mode comprises a mode in which display data is output using a display module of the projection module;
    determining whether a detection signal provided from a state sensor has a first voltage or a second voltage, while operating in the normal mode;
    if it is determined that the detection signal has the first voltage, continuing to operate in the normal mode; and
    if it is determined that the detection signal has the second voltage while operating in the normal mode and the display module of the portable terminal is in on state, automatically turning-on a projection module of the projection module, and switching from the normal mode to the projection mode to operate in the projection mode, wherein the projection mode comprises a mode in which display data is output using the projector module of the projection module,
    wherein the detection signal is generated when the cover approaches within a recognition range of the state sensor by a close and/or an open operation of the cover.

4. The method of claim 3, further comprising:
    determining whether the detection signal provided from the state sensor has the first voltage or the second voltage, while operating in the projection mode.

5. The method of claim 4, further comprising:
    if it is determined that the detection signal has the first voltage while operating in the projection mode, switching from the projection mode to the normal mode, and turning-off the projection module.

6. The method of claim 3, wherein the first voltage is a lower voltage than the second voltage.

7. A projection module mounted in a portable terminal or configured in an external type, the projection module comprising:
    a projection module configured to project display data onto an exterior surface;
    a cover engaged with the projection module and configured to selectively cover and protect the projection module;
    a state sensor configured to detect open and closed states of the cover and to output a corresponding detection signal; and
    a controller configured to automatically control one of on and off of the projection module according to the detection signal provided from the state sensor when a display module of the portable terminal is in one of an on state and an off state,
    wherein the cover is opened and closed in a sliding type moving,
    wherein the detection signal is generated when the cover approaches within a recognition range of the state sensor by a close and/or an open operation of the cover.

8. The projection module of claim 7, wherein the cover comprises a magnetic substance for generating a magnetic field.

9. The projection module of claim 8, wherein the state sensor outputs a second voltage to the controller when the magnetic field is detected from the magnetic substance, and outputs a first voltage to the controller when the magnetic field is not detected from the magnetic substance.

10. The projection module of claim 9, wherein the first voltage is a lower voltage than the second voltage.

11. The projection module of claim 9, wherein the state sensor detects the magnetic field generated by the magnetic substance when the cover is in the open state, and does not detect the magnetic field generated by the magnetic substance when the cover is in the closed state.

12. The projection module of claim 9, wherein the state sensor comprises a magnetic sensor for reacting to the magnetic field.

13. The projection module of claim 9, wherein the controller turns-on the projection module and activates the projection mode when the second voltage is provided from the state sensor.

14. The projection module of claim 13, wherein the controller deactivates the projection mode and turns-off the projection module when the first voltage is provided from the state sensor, while operating in the projection mode.

15. The projection module of claim 13, wherein the controller comprises a General Purpose Input/Output (GPIO) which is electrically coupled to an output port of the state sensor to receive the detection signal.

16. The projection module of claim 8, wherein external display data displayed by the projection module differs from internal display data displayed on the display module.

17. The projection module of claim 16, wherein the internal display data corresponds to a User Interface (UI) with which the display by the projection module may be controlled.

18. The projection module of claim 8, wherein external display data projected by the projection module corresponds to display data transferred to the projection module from a peripheral device operatively connected thereto.

* * * * *